Feb. 1, 1927.

R. P. BLACK

LUBRICANT RETAINER

Filed July 23, 1925

Inventor:
Raymond P. Black
By Wilson & McKenna
Attys.

Patented Feb. 1, 1927.

1,616,105

UNITED STATES PATENT OFFICE.

RAYMOND P. BLACK, OF ROCKTON, ILLINOIS.

LUBRICANT RETAINER.

Application filed July 23, 1925. Serial No. 45,484.

This invention relates to a lubricant retainer for rear axle housings of the type used on Ford cars.

The principal object of the invention is to provide a simple, economical, and effective means for positively preventing the escape of grease and oil about the axle at the ends of the rear axle housing, which ordinarily put brakes out of commission and was otherwise disagreeable and unsightly because it was thrown out onto the spokes, rims, and tires.

I have devised a retainer unit to be sold as an accessory and used in conjunction with the ordinary felt washers now provided as standard equipment, for the purpose of permanently stopping the nuisance referred to, it having been found by experience that felt washers alone afford very little protection and that only for a time and have to be renewed frequently.

The retainer of my invention comprises a steel gland or collar having a drive fit on the axle and having an oil sealing flange or rib rotatably received in a cage having a drive fit inside the axle housing, the cage being made in two semi-circular halves to be fitted about the gland and held together when mounted in the axle housing. The felt washers are placed in front and behind the retainer unit and the pressed sheet metal dust cap ordinarily provided serves to enclose all of the elements in the open end of the axle housing alongside the bearing which is located therein near the outer end thereof.

Figure 1:
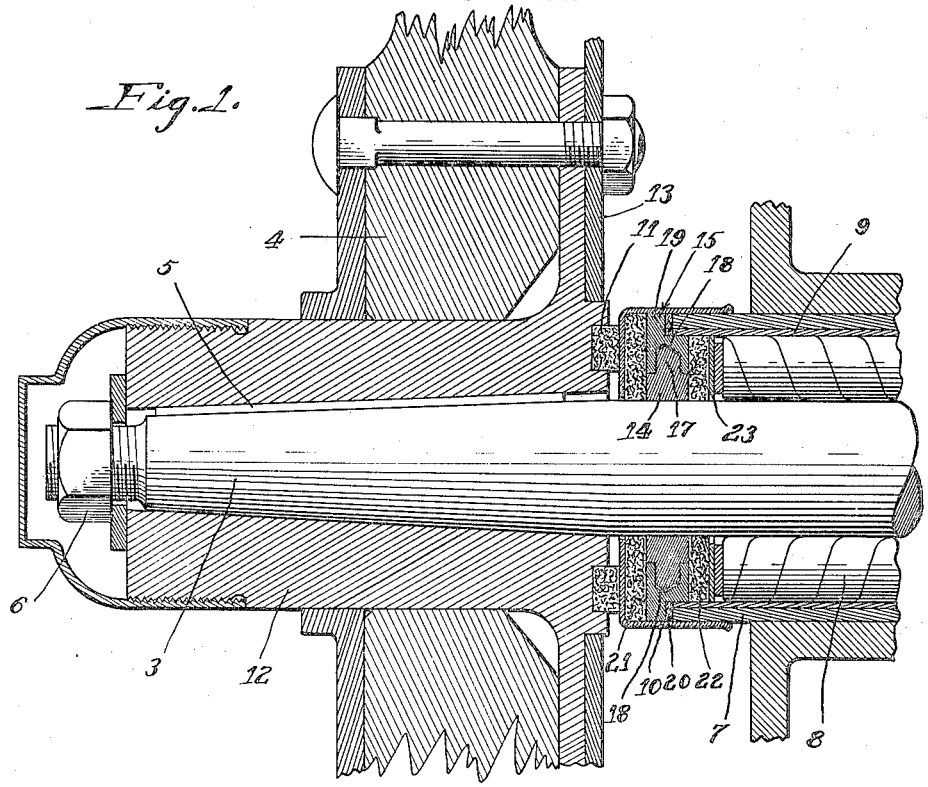
Figure 2:
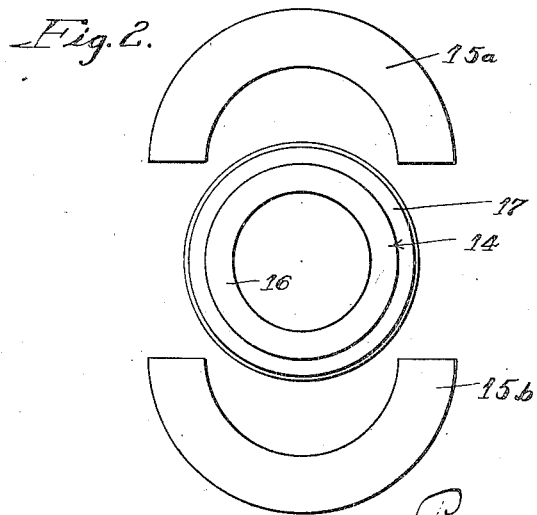

Referring to the drawing illustrating my invention Fig. 1 is a vertical sectional detail through one end of a Ford rear axle housing showing the end of the axle with the wheel mounted thereon and illustrating the manner of application of the lubricant retainer of my invention; and Fig. 2 is a view looking at one face of the retainer with the cage sections shown in distended relation removed from the gland to indicate the manner of assembling of the cage on the gland. In the two views the same reference numerals are applied to the same parts.

The axle 3 which, as illustrated, has a wheel 4 rigidly fixed on the end thereof by means of a key 5 and nut 6, extends from a tubular axle housing 7, in which roller bearings 8 are provided near the outer end thereof. The housing 7 is preferably provided with an accurately machined bushing 9 for the bearing 8 and there is usually provided in connection with the bearing 8 a grease cup or nipple to insure proper lubrication. The differential housing at the middle of the rear axle housing also contains a considerable supply of transmission oil which, in the normal running of the car, sooner or later creeps along the axle to the bearing 8 and this oil with the grease provided for the bearing has been found to give considerable trouble in that it escapes past the felt washers provided alongside the bearing 8 within the end of the axle housing. A dust cap 10 which is illustrated as fitting snugly on the projecting end of the axle housing usually is provided to retain the felt washers referred to. However, it has been found by experience that the felt washers give little or no protection and within a short time are worn and sodden with grease and oil and have to be replaced. The grease and oil very easily passes the felt washers and an auxiliary washer, such as that shown at 11, provided in an annular recess in the hub 12 of the wheel 4. The grease and oil coming in contact with the brakes operating on the drum 13 puts them out of commission or seriously impairs their efficiency. Also, a certain amount of the grease and oil works out onto the spokes, rims, and tires and is quite a nuisance.

In order positively to prevent the escape of grease and oil about the axle at the ends of the rear axle housing, I provide an accessory unit to be used in connection with some of the felt washers now provided as standard equipment, which the purchaser may install himself, permanently to stop the nuisance referred to. The unit comprises a gland 14 and a cage 15. The gland 14 is in the form of a collar having a hub 16 which has a drive fit on the axle 3 and an integral peripheral flange 17 of reduced thickness between the plane front and rear faces of the gland. The flange 17 serves to form a joint with the cage 15 to serve as a seal against the passage of oil and grease. The flange 17 is received in an internal annular groove 18 provided in each of a pair of semi-circular ring sections 15ª and 15ᵇ. The cage sections when placed together serve completely to enclose the gland with the grooves 18 matching and forming a continuous annular internal groove receiving the flange 17. The periphery of the flange may be provided plain or may be given a crown form, as illustrated. The cage 15 has a drive fit inside the bushing 9 in the end of the housing 7 and an annular flange 19 is provided at the front face to limit the inward movement of the cage in the housing 7 as the flange comes up alongside the end of the housing. This flange also provides a part for engagement by a tool, such as a screw driver or chisel, when it is desired to remove the lubricant retainer to permit inspection of the axle bearing or renewal of felt washers. A gasket 20 of cork or other suitable material may be inserted between the flange 19 and the end of the axle housing to serve as an additional sealing against the possible escape of grease and oil. Where desired, shims or the like may be inserted to accurately position the cage in the open end of the axle housing so as not to interfere with the proper functioning of the roller bearing 8. A pair of felt washers 21 and 22 are placed in front and behind the gland and cage as further insurance against the leakage of grease and oil. A metal washer 23 is provided between the felt washer 22 and the bearing 8 to keep them separated. It will be seen that the dust cap 10 fitting over the axle housing completely encloses all of the elements of the oil and grease retainer combination.

The lubricant retainer which I have devised is obviously very simple, compact, and economical to manufacture. It has been found that it positively prevents the escape of grease and oil about the axle at the ends of the rear axle housing. The saving in felt washers effected by the use of the retainer of my invention is also noteworthy as it was necessary with the conventional arrangement to replace the washers at frequent intervals. To make mention of the saving in felt washers is in reality to call attention rather to the tedious and expensive procedure necessitated in replacing old washers with new, the wheel pulling operation thereby necessitated, being in itself a very tedious feature of the job.

I claim:

The combination with an automobile rear axle housing and an axle section extending centrally from the outer end thereof for mounting a wheel thereon, said axle section having a bearing in said housing spaced inwardly from the outer end of said housing and arranged to be suitably lubricated, of a lubricant retaining unit to prevent the escape of lubricant from said bearing through the end of said housing onto the wheel on said axle section, said unit comprising a collar having an enlarged hub portion having a driven fit on said axle section to turn within the open end of said housing and having a reduced peripheral flange portion integral therewith, and a cage for said collar comprising a ring having a driven fit within the end of said housing to be thereby fixed with said housing, said ring having an internal groove receiving the peripheral flange portion of said collar with a working fit so that the collar turns within said ring, and said ring being split diametrically to be fitted over said collar and be thereafter held together when driven into the end of said axle housing, said ring also having a peripheral flange integral therewith to limit the extent to which the ring may be driven into the housing and also to afford a place for engaging a tool to force the retaining unit out of the housing when it is desired to remove the same.

In witness of the foregoing I affix my signature.

RAYMOND P. BLACK.